April 22, 1941.  O. SCHMIDT ET AL  2,239,539
SEXTANT
Filed July 28, 1939
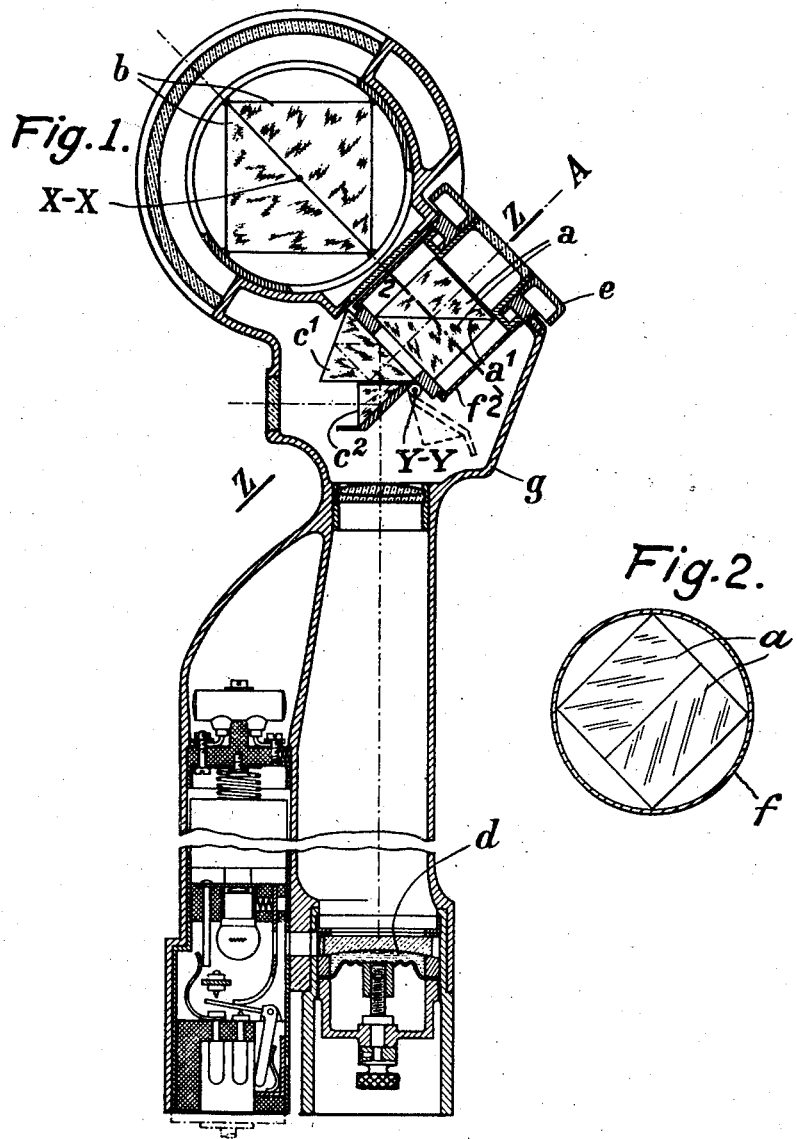
Inventors:
Oswald Schmidt
Hermann Schrumpf Patented Apr. 22, 1941

2,239,539

UNITED STATES PATENT OFFICE 2,239,539

SEXTANT

Oswald Schmidt and Hermann Schrumpf, Jena, Germany, assignors to the firm Carl Zeiss, Jena, Germany Application July 28, 1939, Serial No. 286,973
In Germany August 2, 1938

1 Claim. (Cl. 88—2.4)

Application has been filed in Germany August 2, 1938.

The invention concerns a sextant the housing of which contains a stationary reflecting system offering the observer by means of two additional reflecting systems in front thereof the view of the image of a star and that of an image of a natural or an artificial horizon concurrently, the additional reflecting system for viewing the star being rotatable relatively to the housing for the purpose of adjusting the altitude angle of the viewing direction.

According to the invention, the housing contains a film which is cylindrical at least in part and blackened with a density increasing from the one film end to the other. This film can be adjusted to change the brightness of the star image without that of the image of the horizon being influenced.

It is advantageous to so arrange the film relatively to the stationary reflecting system that part of this film lies between this reflecting system and the rotatable reflecting system for viewing the star.

If a sextant is concerned in which the stationary reflecting system has a partly reflecting and partly transparent surface so positioned relatively to the two additional reflecting systems as to reflect the rays originating from the star and to transmit those coming from the horizon, the film is conveniently in the form of a cylinder arranged in such a manner that it envelops that part of the stationary reflecting system which contains the said surface and that its axis is parallel to the direction of the rays transmitted by this surface.

Fig. 1 of the accompanying drawing shows a sextant according to the invention in elevational section.

Fig. 2 is a cross-section of part of Fig. 1 on line 2, 2.

In this drawing, $a$ is a double prism rigidly connected to the interior of the housing $g$. The surface $a^1$, which separates the two single prisms, is semi-transparently silvered. In front of the double prism $a$ are disposed two prism systems, namely, a double prism $b$, which is rotatable in the housing $g$ about an axis X—X and offers the observer, who is at A, a view of the image of a star, and a prism system consisting of two prisms $c^1$ and $c^2$ for viewing the horizon or a spherical level $d$ disposed in the foot of the sextant. The prism $c^2$ is rotatable about an axis Y—Y into two extreme positions. That of these two positions which is illustrated in the drawing offers the observer the view of an image of the horizon. In the other of the said positions the prism $c^2$ is ineffective, so that the observer can see an image of the bubble of the spherical level. The housing $g$ is provided with a head $e$ rotatable about an axis Z—Z parallel to the axis of the observer's eye. To this head, a film $f$ is rigidly connected in such a manner as to assume the form of a closed cylinder whose axis coincides with the axis of rotation Z—Z of the head $e$. The film $f$ is blackened with a density which is zero at its one end and increases towards its other end. Rotating the head $e$ changes the brightness of the star image produced by the rotatable double prism $b$.

We claim:

In a sextant, a housing containing a stationary reflecting system, said stationary system having a partly reflecting and partly transparent surface and being for simultaneous viewing in two directions, two reflecting systems disposed in front of said stationary system, the one of said two reflecting systems offering the horizon view and having relatively to said surface a position for permitting a transmission of the rays originating from the horizon by said surface, and the other of said two reflecting systems offering the view of the star and having relatively to said surface a position for permitting a reflection of the rays originating from the star by said surface, said other reflecting system being rotatable for adjustment of the altitude angle of the viewing direction, a circularly curved film which is blackened with a density increasing from the one film end to the other, said film lying in part between said stationary system and said rotatable system and being rotatably mounted on said housing about an axis parallel to the direction of the rays transmitted by said surface, and means for rotating said film.

OSWALD SCHMIDT.
HERMANN SCHRUMPF.